United States Patent [19]

Misawa et al.

[11] Patent Number: 5,236,030
[45] Date of Patent: Aug. 17, 1993

[54] PNEUMATIC TIRE WITH INNER LINER OF ULTRA HIGH MOLECULAR WEIGHT POLYETHYLENE FILM AND METHOD OF MAKING THE SAME

[75] Inventors: Makoto Misawa, Tokyo; Hiroshi Hirakawa, Isehara; Masao Inoue, Fujisawa, all of Japan

[73] Assignee: The Yokohama Rubber Co., Ltd., Japan

[21] Appl. No.: 685,671

[22] Filed: Apr. 16, 1991

[30] Foreign Application Priority Data

Apr. 23, 1990 [JP] Japan .................... 2-105384

[51] Int. Cl.$^5$ .................................. B60C 5/14
[52] U.S. Cl. ................. 152/510; 152/DIG. 16; 156/123
[58] Field of Search ............ 152/510, DIG. 16; 156/110.1, 115, 123

[56] References Cited

U.S. PATENT DOCUMENTS 5,040,583 8/1991 Lin et al. .................... 152/510

FOREIGN PATENT DOCUMENTS

| 31761 | 8/1972 | Japan .................... 152/510 |
| 60-165227 | 8/1985 | Japan . |
| 1-123837 | 5/1989 | Japan . |
| 2023516 | 1/1980 | United Kingdom . |

OTHER PUBLICATIONS

Kirk-Othmer, Encyclopedia Chemical Technology, 3rd edition, vol. 10, pp. 229-230, 1980.
Encyclopedia of Polymer Science and Engineering, vol. 6, pp. 490-494, 1986.

Primary Examiner—Geoffrey L. Knable
Attorney, Agent, or Firm—Finnegan, Henderson, Farabow, Garrett & Dunner

[57] ABSTRACT

A pneumatic tire for automobile having an inner liner of a thin film of ultra high molecular weight polyethylene, which film is laminated directly over an inner wall of green tire and firmly bonded thereto when the tire is vulcanized.

2 Claims, 1 Drawing Sheet

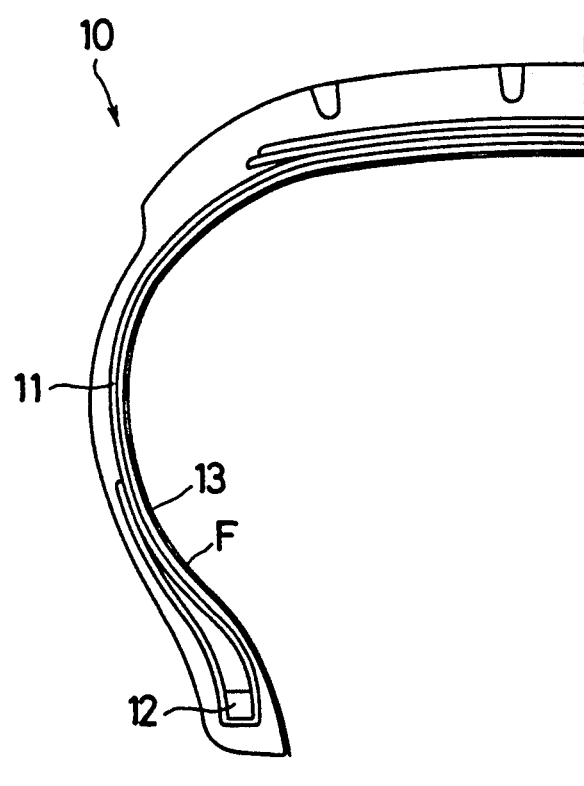

PNEUMATIC TIRE WITH INNER LINER OF ULTRA HIGH MOLECULAR WEIGHT POLYETHYLENE FILM AND METHOD OF MAKING THE SAME

BACKGROUND OF THE INVENTION

1. Field of the Invention

This invention relates to a pneumatic tire and a method of making the same.

2. Prior Art

Research and development efforts in the automobile industry have been of late directed more to reducing fuel consumption, inter alia, and such efforts are focussed among other technological approaches on the production of light weight pneumatic tires.

Standard pneumatic automobile tires are interiorly lined with a gas-impermeable layer such as butyl rubber. However, because, butyl rubber does not adhesively bond well with other rubber materials, it is necessary to resort to a tie gum or other suitable adhesive sheet applied intermediate between a butyl rubber liner and a rubber-coated carcass layer in a tire structure. Furthermore, butyl rubber per se is not completely impermeable and therefore its liner thickness must be increased at least to the order of several hundred $\mu M$ to be able to maintain a requisite air pressure in the tire. Thus, the thickness of a butyl rubber liner together with the thickness of an intermediate adhesive layer of tie gum or the like adds up to a total thickness exceeding 1 mm (1,000 $\mu M$) which in turn contributes to increased weight of the tire.

SUMMARY OF THE INVENTION

With the foregoing difficulties of the prior art in view, the present invention seeks to provide an improved pneumatic tire for a automobile which is highly retentive of air pressure and has considerably reduced weight.

The invention also provides a method of making such a tire.

According to one aspect of the invention, there is provided a pneumatic tire incorporating an inner liner comprising a film of ultra high molecular weight polyethylene.

According to another aspect of the invention, there is provided a method of making a pneumatic tire which comprises laminating a film of ultra high molecular weight polyethylene as an inner liner over an interior wall of an unvulcanized tire and then subjecting the tire to vulcanization.

The invention will be better understood from the following detailed description taken in conjunction with the accompanying drawing.

BRIEF DESCRIPTION OF THE DRAWING

The accompanying drawing is a cross-sectional view of a half portion of a pneumatic tire embodying the invention.

DETAILED DESCRIPTION OF THE INVENTION

Referring to the drawing, there is shown a pneumatic tire 10 which comprises a rubber-coated carcass layer 11 wrapping a bead core 12 and an inner liner F constituting an innermost layer 13 laminated over the carcass layer 11.

The liner F is formed from a ultra high molecular weight (UHMW) polyethylene into a film having a thickness in the range of 30 $\mu M$–200 $\mu M$. Greater than 30 $\mu M$ thicknesses ensure freedom of air leaks and hence good retention of constant air pressure of the tire 10. The upper limit of 200 $\mu M$ provides adequate flexibility of the inner liner F.

The term ultra high molecular weight polyethylene as used herein designates a polyethylene having an average molecular weight exceeding 1,000,000. Lower than 1,000,000 molecular weights would result in failure of the polymer film formation during vulcanization of the tire because the film tends to melt and ooze out off the wall of the adjoining carcass layer. For the purpose of the invention therefore, the molecular weight of the polyethylene is literally the higher the better, but its upper limit is dictated by the processability of this material with existing technology.

Advantageously, ultra high molecular weight polyethylene films have a relatively small specific gravity and therefore serve to reduce the tire weight.

Conventional high density polyethylene, polypropylene, or other polyolefines than UHMW polyethylene, is intrinsically not adhesive to rubber, vulcanized or unvulcanized, and the use of any adhesive agents is not significantly effective.

It has now been found that a film of ultra high molecular weight polyethylene can be laminated directly over the inner surface of a green tire, followed by vulcanization of the tire, to provide a firmly and uniformly bonded inner liner. Thus, the method of the invention essentially comprises laminating a film of ultrahigh molecular weight polyethylene as an inner liner over an interior wall of unvulcanized tire and vulcanizing the tire.

The invention will be further described by way of the following example.

EXAMPLE

There were prepared two different types of pneumatic tires of the same 185/70R14 size.

Inventive Tire

A green tire was laminated interiorly with a film of polyethylene having an average molecular weight of 5,500,000 and a thickness of 60 $\mu M$ and thereafter vulcanized under standard conditions.

Comparative Tire

An inner liner made of unvulcanized butyl rubber about 500 $\mu M$ thick was applied to the interior wall of a green tire with use of a tie gum about 700 $\mu M$ thick. The tire was thereafter vulcanized under standard conditions.

Air Leak Test

The above tires were mounted on a standard rim at room temperature (21° C.) and let stand still with tire air pressure held at 2.0 kgf/cm$^2$ for 48 hours, followed by re-adjustment to the same pressure. The tires were tested every 48 hours over a period of 3 months. The resulting test data were regressed by the method of least squares to $y^{-\beta t}$ where y is air pressure (measured pressure/2.0), t is time (30 days) and $\beta$ is air leak coefficient. Air pressure drop (Z) was computed by the formula $$Z(\%/month) = (1 - y^{-\beta \times 30}) \times 100$$

The test results are shown in the following table.

TABLE

| | (Air Leak Test) | |
|---|---|---|
| | Inventive Tire | Comparative Tire |
| Inner Liner | UHMW polyethylene | Butyl rubber and tie gum |
| Z | 2.5 | 2.6 |

It is thus apparent that the Inventive Tire is comparable in air retention capabilities to the Comparative Tire despite the fact that the liner thickness of the former is about one eighth (⅛) of that of the latter.

Further advantageously, the Inventive Tire incorporating an inner liner which weighs about 30 grams is far lighter than the Comparative Tire including an inner liner consisting of butyl rubber and tie gum and weighing about 650 grams.

Obviously, various modifications and variations of the present invention are possible in the light of the above teaching. It is therefore to be understood that within the scope of the appended claims the invention may be practiced otherwise than as specifically described.

What is claimed is:

1. In a pneumatic tire having a tread portion and a rubber-coated carcass layer portion with an air impermeable inner liner on an interior wall of the carcass layer, the improvement which comprises said inner liner being a film consisting essentially of ultra high molecular weight polyethylene laminated directly over said interior wall and having an average molecular weight in excess of 1,000,000 and a thickness of from 30 $\mu$m to 200 $\mu$m.

2. In a method for making a pneumatic tire having a tread portion and a rubber-coated carcass layer portion having an air impermeable inner liner on an interior wall of the carcass layer, the improvement comprising laminating a film consisting essentially of ultrahigh molecular weight polyethylene having an average molecular weight in excess of 1,000,000 and a thickness of from 30 $\mu$m to 200 $\mu$m directly to said interior wall of the carcass layer of an unvulcanized tire and then subjecting the tire to vulcanization.

* * * * *